April 21, 1959 J. L. McLUCAS 2,883,658

RADAR-RELAY SYSTEM

Filed Jan. 20, 1955 2 Sheets-Sheet 1

INVENTOR.
JOHN L. McLUCAS
BY Mitchell & Bechert
ATTORNEYS

INVENTOR.
JOHN L. McLUCAS
BY
Mitchell & Bechert
ATTORNEYS 2,883,658
Patented Apr. 21, 1959

2,883,658

RADAR-RELAY SYSTEM

John L. McLucas, State College, Pa., assignor to Haller, Raymond and Brown, Inc., State College, Pa., a corporation of Pennsylvania Application January 20, 1955, Serial No. 482,998

18 Claims. (Cl. 343—11)

My invention relates to bandwidth-compression devices and, in particular, to the application of such devices to radars, for the purpose of channeling only the important fraction of available intelligence into relatively narrow-band communication channels.

It is an object of the invention to provide improved means of the character indicated.

It is another object to provide a bandwidth-compression device for a radar and inherently applicable to the remote transmission of radar intelligence over a minimum of conventional communication channels, as of the 3-kcs. bandwidth variety.

It is a specific object to meet the above objects with a device making it possible to compress signals from a P.P.I. (plan-position-indicating) radar into a single communication link, with minimum sacrifice in definition of targets developed in operation of the radar.

It is another specific object to achieve the above objects with a device which can additionally accommodate range marks, I.F.F. (identification of friend or foe) signals, bearing-reference data, and antenna rotation rate, all on the same single limited communication link.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, my invention contemplates certain preliminary processing of slowed-down video signals (and of synchronizing and other pulses) prior to modulation for transmission over commercial or military-type communication links. The signal processing is such as to reduce to a minimum the inherent bandwidth requirements for accommodating all necessary components of the available intelligence. Signals are reduced to standardized shape and level prior to modulation, and bandwidth requirements are further reduced by employing coherent modulator means. The arrangement is such that not only may the slowed-down video be on a single communication channel, but also synchronizing pulses, reference-bearing pulses, range marks, and I.F.F. data may be handled in the same channel. In order to facilitate decoding at the receiving end of the communication link, I provide means inherent in the operation of the modulator for assuring that slowed-down video will be transmitted at a first characteristic level and that synchronizing pulses and reference-bearing pulses will be transmitted at a different characteristic level.

In one general form to be described, separate modulators are employed for the slowed-down video and for the synchronizing and reference-bearing pulses, there being provision for disabling or cutting off the video modulator whenever synchronizing or reference bearing pulses occur. In the other general form, the synchronizing and reference-bearing pulses are mixed with the slowed-down video and are processed by a single modulator at uniform level, there being provision to achieve the above-mentioned objects by controlling the gain of the modulator carrier upon occurrence of synchronizing or reference-bearing pulses.

Figure 1:
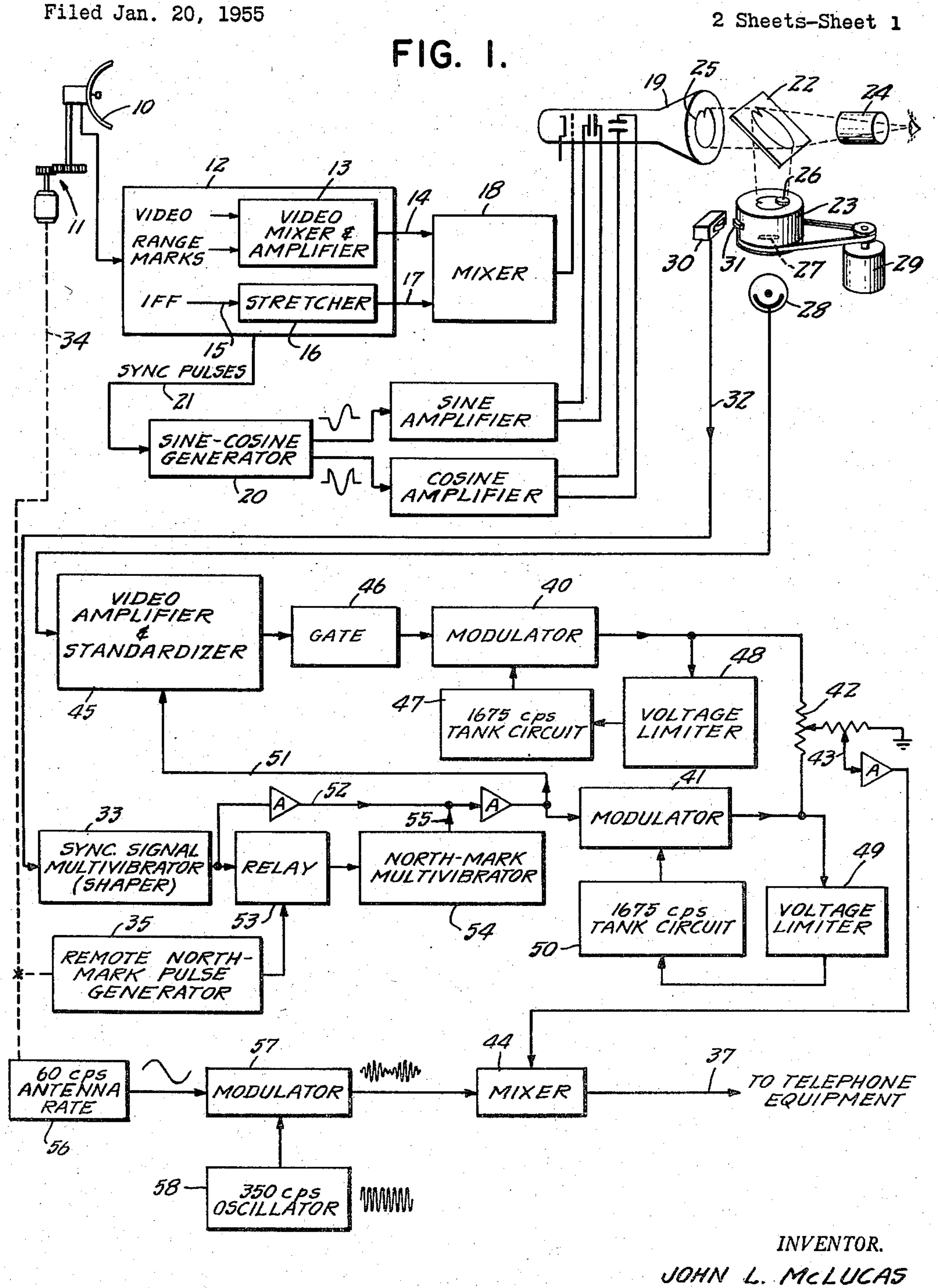
Fig. 1 is an electrical block diagram schematically showing components of a radar including band-compression means and modulator means of the invention.

Referring to Fig. 1 of the drawings, my invention is shown in application to a P.P.I. radar having an antenna 10 and drive means 11 for continuously rotating the same. The radar may include a receiver 12 containing, among other things, a video mixer and amplifier 13, accepting raw video and range-mark pulses (synchronized with the pulse-repetition rate of the radar) and developing what will be called a radar-video signal in an output line 14. The radar 12 may also include I.F.F.-responsive means developing characteristic I.F.F. pulses in a line 15; as will later more clearly appear, I process the I.F.F. pulses in a stretcher 16, whereby an elongated pulse is derived in an output line 17 for each incoming I.F.F. pulse or train of I.F.F. pulses.[1] The radar-video line 14 and the I.F.F.-pulse line 17 are shown applied to a mixer 18, so that a single video may be fed to a band-compressor.

The band-compressor shown is of the variety in which an optical scanner integrates a J-scope presentation of the radar video at a rate representing a substantial submultiple of the pulse-repetition frequency of the radar. The J-scope display is created on a cathode-ray tube 19, intensity-modulated by the output of mixer 18; the deflection circuits for tube 19 are supplied by circular-sweep means 20, synchronized with the pulse-repetition frequency of the radar, as suggested by connection 21.

In the form shown, light from the cathode-ray tube 19 passes to a beam splitter or semi-reflecting mirror 22. Most of this light is reflected into the scanner 23, but enough may pass through the mirror to allow an operator to view through optics 24, as when making adjustments of the position and intensity of the circular J-scope trace 25. The scanner 23 is shown to contain a lens 26 so located as to focus a small arc of the circular trace 25 onto a slit 27. Light passing through the slit 27 is evaluated by a photomultiplier 28. A motor 29 continuously rotates the scanner 23 so as to cause the photomultiplier 28 to look at successive elements of the circular trace. Since the rotation rate of the scanner 23 is very much reduced from the pulse-repetition frequency of the radar, the output of the photomultiplier 28 is a signal which is a slowed-down version of the original video-signal output of mixer 18. This output of photomultiplier 28 is therefore called the slowed-down video signal.

For good design, the scanner-rotation rate is chosen to match the "time on target" of the parent radar 10—12 and may be anywhere between a few hundred and several thousand revolutions per minute, depending upon the directivity index of the antenna 10 and upon the speed of drive means 11. For the radar known as the TPS–*1d*, a satisfactory scanner speed is about 500 r.p.m. Thus, the period of the narrow-band (or slowed-down) video train from the photomultiplier 28 may for this particular radar be about ⅛ second long, compared with about 1/1000 second for the raw video (assuming a 100-mile range).

[1] Typical stretching of I.F.F. pulses is of the order of 50 microseconds, making them appear five miles long.

Synchronizing signals based on the period of the slowed-down video may be readily derived by a fixed magnetic pick-up element 30 in conjunction with a magnetic element 31 carried on the scanner 23, so that for each pass of element 31 past element 30 a synchronizing pulse may be developed in line 32. These synchronizing pulses are shown standardized by a circuit 33, which may be a one-shot or single-stability multivibrator, serving uniformly to shape all synchronizing pulses as to level and duration.

I have suggested by means of the dashed line 34 that pulses may be derived to identify the instant at which the antenna 10 passes through a given reference bearing. For purposes of the present disclosure, such reference bearing will be simply referred to as "North," so that the generator 35 will be understood to provide a North-identifying pulse each time the antenna 10 passes through North.

In accordance with the invention, I provide novel means whereby a maximum fraction of the intelligence in the raw video (developed as slowed-down video at the output of photomultiplier 28) may be accommodated in a single communication link, as suggested by the output line 37. The legend applied to line 37 indicates accommodation by telephone lines, but it will be appreciated that this legend is purely illustrative, in that the line 37 may just as well be accommodated by any conventional radio-communication channel of equally limited bandwidth. In the form shown, separate modulators 40—41 separately accommodate the slowed-down video and the synchronizing and North-mark pulses, respectively. The outputs of the modulators are multiplexed by a summing network, including a voltage divider 42 with manually adjustable means for determining the relative level of multiplexing the respective outputs of modulators 40—41, the preferred arrangement being such that the magnitude of modulated synchronizing and North-mark pulses substantially exceeds the level of the modulated slowed-down video signals. At 43, I suggest further means whereby the level of the multiplexed modulated signals may be adjusted, for supply to a mixer 44, to be later described.

I have indicated the desirability of maximum standardization and shaping of input signals supplied to the respective modulators. In the case of the slowed-down video, I show a standardizer 45, which is in reality a threshold device in conjunction with a clipper, whereby such video signals as exceed threshold are passed with uniform amplitude to a gate 46. The gate 46 may be a single-stability multivibrator for further uniformly shaping pulses reflecting the video. The shaped pulses issuing from gate 46 operate on the modulator 40 to ring and to quench a tank circuit 47 tuned to the carrier frequency, which, for the assumed example given above, may be of the order of 1675 c.p.s., as shown by legend in the drawing. A voltage limiter 48 is shown responsive to the modulator 40 and in controlling relation with the tank circuit 47. In like manner, a voltage limiter 49 and tank circuit 50 may function under control of the modulator 41. The devices 40—47—48 and 41—49—50 will be seen to have the functions of keyed oscillators, in that they determine bursts of 1675–c.p.s. signal, all in accordance with their respective input-signal or modulating-signal control, from gate 46, or from multivibrators 33—54, as the case may be; such structure will be understood to support the broad term "modulator" as used throughout the present description, and the function of line 51 is to determine the time-sharing basis according to which the outputs of modulators 40—41 are applied to the circuit 42—43.

As indicated, the preferred arrangement is that the synchronizing signals shall be effective to cut off the modulator 40 or to disable the supply of video signals thereto. In the form shown, this is effected by a line 51 connecting the input of modulator 41 to a gain-control connection in amplifier 45, all synchronizing signals being fed directly from multivibrator 33 to the input of modulator 41 by way of line 52. Thus, the summing circuit 42—43 will be supplied by modulator 40 to the exclusion of modulator 41 in the periods between synchronizing pulses; but, for the duration of each synchronizing pulse, modulator 41 will be activated and modulator 40 deactivated.

In accordance with another feature of the invention, the described arrangement may be employed so to shape the North-mark pulse as to provide an inherently simple yet characteristic display at the decoding end of the communication link. In such display, I desire that the North mark shall be evidenced by a radial strobe of length preferably equivalent to the full-range display and therefore substantially equal to the period between synchronizing pulses. At relay 53 I suggest means responsive both to the synchronizing pulses and to the North-mark pulses, and at multivibrator 54 I suggest a means for developing North-mark pulses of the desired elongation. Thus, the function of relay 53 may be to activate multivibrator 54 for the synchronizing pulse immediately following a North-mark pulse supplied from generator 35; the multivibrator 54 may stay in this activated condition until reception of the next synchronizing pulse (as supplied by relay 53), at which time the multivibrator 54 will change its state, and relay 53 will be deactivated. I show at 55 that the elongated pulse developed by multivibrator 54 may be added to the synchronizing signals in line 52 so as to govern the operation of modulator 41 and effectively to deactivate the slowed-down video, as discussed above for the case of synchronizing signals.

To complete the necessary intelligence applied at 37 to the communication link, I show means 56 responsive to the rate of antenna rotation, as, for example, a 60-c.p.s. generator whose frequency varies with antenna rate. The output of generator 56 may be applied directly to the mixer 44, but I prefer to elevate the frequency, as by employing a further modulator 57 to apply antenna-rate signals to the carrier frequency of an oscillator 58. The carrier frequency of oscillator 58 is preferably substantially removed from that identified with modulators 40—41.

Figures 2, 3:
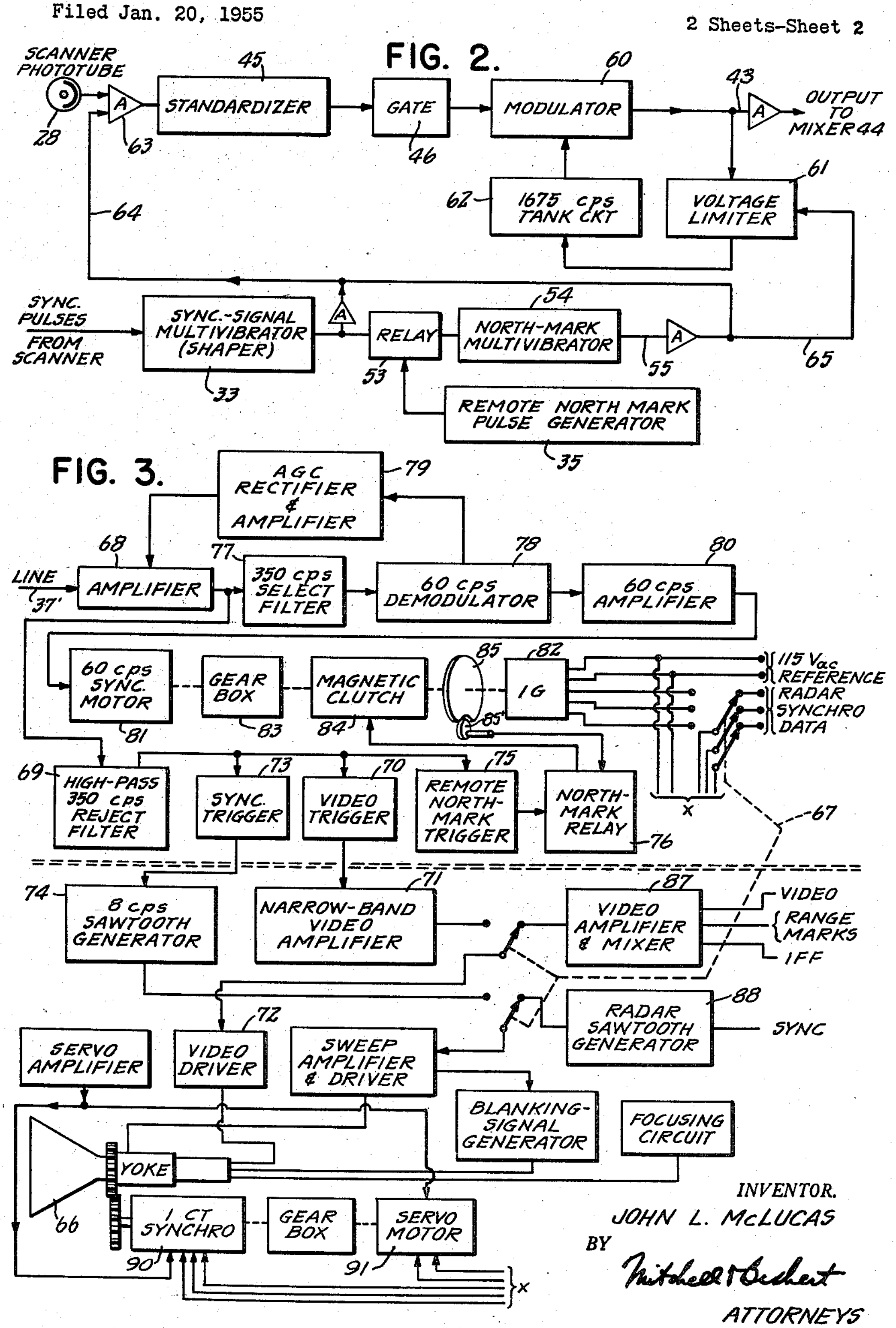
Fig. 2 is a fragmentary diagram illustrating a modified modulator for the arrangement of Fig. 1.
Fig. 3 is a similar diagram, but illustrating decoding equipment for demodulating and for displaying signals compressed by the forms of either Fig. 1 or Fig. 2.

Fig. 2 shows an alternative arrangement of parts, employing a single modulating means 60 to handle the slowed-down video as well as the synchronizing and North-mark pulses. The single modulator 60 may again employ a voltage limiter 61 and tank circuit 62 accommodating all these signals, and yet may be caused to proportion the components of the modulated output in accordance with the above discussion. The synchronizing pulses and the North-mark pulses may be processed as previously described, and the elements for effecting these functions are therefore given the same reference numerals as in Fig. 1. Slowed-down video developed by photomultiplier 28 is shown fed to the standardizer 45 by way of one input to an amplifier 63; another input 64 to amplifier 63 accepts synchronizing pulses and North-mark pulses for application to the standardizer 45. The standardizer 45 and gate 46 trim all signals to the same level; but by providing a control connection 65 to the voltage limiter 61, I achieve the desired amplitude proportion as between synchronizing and North-mark pulses on the one hand, and video signals on the other; a preference has previously been indicated that the magnitude of modulated synchronizing and North-mark pulses shall substantially exceed the level of the modulated slowed-down video signals. Signals of correct amplitude proportion are thus available in line 43 for supply to mixer 44.

Fig. 3 shows decoding equipment responsive to all intelligence transmitted over the communication link by the line 37. Such intelligence arrives at the decoding equipment at the line designated 37′ and is suitably transcribed and processed to produce on the face of the display tube 66 a properly synchronized P.P.I. display, reflecting operation of the radar 10—12. The particular decoding and display circuitry of Fig. 3 also incorporates novel features whereby locally developed radar signals may be selectively accommodated and displayed, as upon operation of a ganged plurality of selector switches, designated generally by the ganged connection 67. In Fig. 3, all switches are shown establishing connections for operation of the display 66 from the local radar, but, upon throwing switch means 67 to the other position, the display at 66 will reflect function of the radar 10—12.

After preliminary amplification at 68, the signals to be decoded are passed through a high-pass filter 69 which rejects the carrier for the antenna-rate signal. All remaining signals are regarded as video and this includes the synchronizing pulse, the slowed-down video, and the North-mark pulses. All of these signals are accepted by a video-trigger circuit 70, and those which are above the threshold of circuit 70 generate a standard output signal, which is shown passed to an amplifier 71 for direct application to the video amplifier 72 for the indicator 66.

The synchronizing signal is substantially above the amplitude of the slowed-down video, when applied at the encoder mixer 44 (see Figs. 1 and 2); aside from noise effects on development of synchronizing signals, the synchronizing trigger circuit 73 is therefore preferably of a variety which, once triggered, will remain inactive for a substantial fraction of the synchronizing period. Thus, circuit 73 favors video signals having the repetition rate of the synchronizing signal and uses signal amplitude to discriminate against low-level signals which might trigger it. The output of circuit 73 may be a pulse used to actuate a sweep generator 74 for use in radially deflecting the beam of tube 66 when displaying decoded slowed-down video.

For the North-mark-signal treatment described in connection with Figs. 1 and 2, the North-mark signal passed by filters 69 is in reality a synthetic continuous target, lasting for substantially the period between synchronizing pulses. This will cause a full-length radial strobe at North in the display at 66. For North-orientation purposes, the North-mark decoder must discriminate against noise, and the North-mark trigger circuit 75 is therefore preferably an integrator which will not trigger on any signal which does not last for a period which is much less than the known length of North-mark signals. When triggered, the circuit 75 may operate a relay 76 which is tied in with a synchro system to be explained below.

To derive antenna rate from the output of amplifier 68, I show a selection filter 77 responsive essentially only to the carrier frequency for the antenna-rate signal. This signal is demodulated at 78 and supplied with a level (controlled by means 79) to an antenna-rate amplifier 80. This signal is amplified and used to drive a synchronous motor 81, which in turn drives a synchro 82 through a gear box 83. The position of the synchro 82 thus follows the position of the antenna 10 at the encoder end of the system, but the synchro 82 may have position error with respect to the antenna 10 unless North is re-established at the decoder end of the system. In the form shown, this is accomplished as follows:

A magnetic clutch 84 in series with the synchro drive system is ordinarily energized by relay 76 so that synchro 82 is continuously driven. When the synchro 82 reaches "local North," as represented by the notch position of a local North cam 85 (with respect to a relay-disabling element 85′), relay 76 de-energizes clutch 84 to stop synchro 82 unless a North-mark pulse is received from the remote end of the system. Arrival of the North-mark pulse serves to "hold-in" the relay 76 and therefore the magnetic clutch 84, so that synchro rotation is not disturbed. If the system is not in synchronism, the synchro 82 stops the first time the local North cam 85 reaches North and remains motionless until the arrival of the next remotely derived North-mark signal, as identified by operation of trigger 75. At that time, the synchro 82 starts to rotate and stays in synchronism until noise disturbs the signal. The synchro 82 forms part of a servo loop (including also the synchron 90 and motor 91) for positioning the deflection yoke of the indicator 66, and the grouped designation *x*—*x* will be understood to suggest this connection when the switch 67 has been thrown to the proper position.

As indicated generally above, the circuit of Fig. 3 is capable of accepting either normal raw (broad-band) radar video, as from a local radar set, or narrow-band video as available at the end 37′ of the communication link. Since the bandwidth requirements for a universal video amplifier would be difficult to meet, I show two separate video amplifiers, being the amplifier 71 (already described) and the amplifier 87 (which may be a part of the local radar set). Also, since the sweep rates for spot deflection on indicator 66 are so radically different for the two applications, separate sweep generators are shown. The slow-rate sweep generator 74 for the narrow-band video has already been described, and a fast-rate sweep generator 88 is shown for selective connection to the indicator 66, depending upon whether a narrow-band or a raw radar display is to be employed. The yoke-drive system for rotating the strobe for a P.P.I. display at 66 may be conventional, and may therefore directly accept both the described output of synchro 82 and the output of the local-radar synchro, depending upon the selected position of switch 67. When display from the remote radar 10 is selected, tube 66 will present full P.P.I. information, including range marks, I.F.F. signals (an elongated radial strobe), and a full North-identifying radial strobe.

It will be appreciated that I have described novel means for compressing into a commercial or military communication channel a minimum bandwidth of radar signals while preserving the essential intelligence, thereby improving the efficiency of remote transmission of radar data. By my circuits, it is possible to accommodate all the necessary intelligence of a standard radar, such as the TPS–1*d*, on a single 3-kcs. channel of intelligence. For other types of radars having more sharply directional antennas or faster sweep rates, greater bandwidth may be necessary and, in such event, the use of a second channel, with suitable carriers and demodulators, may be necessary; however, the basic principles of minimized bandwidth requirements are the same as for the present illustrative embodiments.

While I have described the invention in detail for the preferred forms shown, it will be understood that modifications may be made without departing from the scope of the invention as defined in the claims which follow.

I claim:

1. In a radar system, band-compression means including a periodically recycling scanner responsive to a radar-video signal and developing a substantially slowed-down video signal for use in creating a radar display, means developing intermittent synchronizing pulses in accordance with the recycling rate of said scanner, means multiplexing said synchronizing pulses with said video signal, means standardizing the level of said multiplixed signal, and means for modulating a carrier frequency with said standardized multiplexed signal.

2. In a radar system, band-compression means including a periodically recycling scanner responsive to a radar-video signal and developing a substantially slowed-down video signal for use in creating a radar display, means developing intermittent synchronizing pulses in accordance with the recycling rate of said scanner, means multiplexing said synchronizing pulses with said video signal, means standardizing the level of said multiplexed signal, means for modulating a carrier frequency with said standardized multiplexed signal, and a gain-control connection from said synchronizing-pulse means to said modulating means, said connection being such as to raise the level of the carrier-modulated signal upon occurrence of a synchronizing pulse.

3. In a radar system, band-compression means including periodically recycling means responsive to a radar-video signal and developing a substantially slowed-down video signal for use in creating a radar display, means developing synchronizing pulses in accordance with the recycling rate of said recycling means, modulator means for modulating a carrier frequency with said synchronizing pulses and with said video signal, and means responsive to said synchronizing pulses for elevating the level of the modulating carrier upon occurrence of said synchronizing pulses, said elevation of level being substantially for the duration of said synchronizing pulses and to the substantial exclusion of the period between synchronizing pulses.

4. In a radar system, band-compression means including periodically recycling means responsive to a radar-video signal and developing a substantially slowed-down video signal for use in creating a radar display, means developing synchronizing pulses in accordance with the recycling rate of said recycling means, first modulator means for modulating a carrier frequency with said synchronizing pulses, second modulator means for modulating a carrier frequency with said video signal, and means responsive to said synchronizing pulses for disabling said first modulator means for substantially the duration of each synchronizing pulse.

5. The system of claim 4, and including means for multiplexing into a single channel the outputs of both said modulators.

6. A system according to claim 5, in which said last-defined means includes a summing network, and in which the level of signals from said first modulator is substantially less than the level of signals from said second modulator as summed by said network.

7. In a radar system, a receiver including means developing a radar-video signal, said radar system further including means for identification of friend or foe and developing output pulses hereinafter called I.F.F. signals, I.F.F.-signal responsive means including pulse-stretching means developing an elongated pulse for each I.F.F. signal, means mixing said video and stretched-I.F.F. signals, band-compression means including a periodically recycling device responsive to the mixed radar-video and stretched-I.F.F. signals and developing a substantially slowed-down video signal for use in creating a radar display, means developing synchronizing pulses in accordance with the recycling rate of said recycling device, and modulator means for modulating a carrier frequency with said synchronizing pulses and with said slowed-down video signal.

8. In a radar system, a receiver including means developing a radar-video signal, range-mark signal means synchronized with the pulse-repetition rate of the radar, means mixing said video and range-mark signals, band-compression means including a periodically recycling device responsive to the mixed radar-video and range-mark signals and developing a substantially slowed-down video signal for use in creating a radar display, means developing synchronizing pulses in accordance with the recycling rate of said recycling device, and modulator means for modulating a carrier frequency with said synchronizing pulses and with said slowed-down video signal.

9. In a radar system, band-compression means including periodically recycling means responsive to a radar-video signal and developing a substantially slowed-down video signal for use in creating a radar display, means developing synchronizing pulses in accordance with the recycling rate of said recycling means, modulator means for modulating a carrier frequency with said synchronizing pulses and with said video signal, said modulator means including a tank circuit tuned to the carrier frequency, and means including a voltage limiter for activating and deactivating said tank circuit.

10. A system according to claim 9, in which said synchronizing pulses and said slowed-down video are both fed to a single modulator, and in which means responsive to said synchronizing pulses is in gain-controlling relation with said voltage limiter.

11. A system according to claim 9, in which said modulator means comprises two like modulators with like tank circuits and voltage limiters and tuned to substantially the same carrier frequency, said slowed-down video being connected in controlling relation with one of said modulators, said synchronizing pulses being connected in controlling relation with the other of said modulators, and means responsive to said synchronizing pulses for cutting off the supply of slowed-down video signal to said first modulator substantially only upon the occurrence of said synchronizing pulses.

12. In combination, a plan-position-indicating radar, including an antenna and means for continuously rotating the same, band-compression means including periodically recycling means responsive to a radar video signal and developing a substantially slowed-down video signal for use in creating a plan-position-indicating display, means developing synchronizing pulses in accordance with the recycling rate of said scanner, means responsive to the training of said antenna through a reference bearing and generating an identifying pulse, modulator means for modulating a carrier frequency with said synchronizing pulses and with said slowed-down video signal and with said identifying pulse, whereby upon demodulation, said identifying pulse may appear as a radial strobe in the display.

13. The combination according to claim 12, in which said means for developing a bearing-identifying pulse includes means responsive to the period between synchronizing pulses for shaping an elongated identifying pulse of length substantially equal to the period between synchronizing pulses upon occurrence of each identifying pulse, whereby the reference bearing may appear in an ultimate plan-position-indicating display as a full radial strobe.

14. The combination according to claim 13, in which said last-defined means includes means synchronizing the leading and trailing edges of said elongated pulse with the occurrence of synchronizing pulses.

15. In combination, a plan-position-indicating radar including a directional antenna and means for continuously rotating the same, band-compression means including periodically recycling means responsive to a radar video signal and developing a substantially slowed-down video signal for use in creating a plan-position-indicating display, means for developing synchronizing pulses in accordance with the recycling rate of said scanner, means for modulating a carrier frequency with said synchronizing pulses and with said video signal, antenna-rate-responsive means developing a signal of frequency reflecting the rotation-rate of said antenna, and means for mixing said last-mentioned signal with said modulated-carrier signal.

16. The combination according to claim 15, in which said antenna-rate-responsive means includes means for modulating a second carrier frequency substantially removed in frequency from the frequency of said first-mentioned carrier frequency.

17. In combination, a plan-position-indicating radar including means developing in a single channel a slowed-down video signal including a synchronizing signal characteristically identified with the period of slowed-down video, display means supplied by said channel and including a radial sweep and means for continuously rotating the same, a first sweep generator synchronized with the pulse-repetition frequency of said radar and in controlling relation with said radial sweep, decoding means including an input accepting said slowed-down video signals including said synchronizing signal, a second sweep generator synchronized by said synchronizing signal, and selector switch means having a first selected condition connecting said slowed-down video and said second sweep generator to said display means and having a second selected condition connecting the radar video and said first sweep generator to said display.

18. In combination, a plan-position-indicating radar, display means including a radial sweep and means for continuously rotating the same, a first sweep generator synchronized with the pulse-repetition frequency of said radar and adapted for controlling relation with said radial sweep, said radar developing in one channel mixed compressed radar-video signals and antenna-rate signals, and synchronizing signals characteristically identified with the period of said compressed video, decoding means responsive to said mixed compressed radar-video signals and antenna-rate signals and synchronizing signals, a second sweep generator synchronized with said synchronizing signal and adapted for controlling relation with said radial sweep, said decoding means including means separately deriving the compressed video and the antenna-rate signals, and selector switch means having a first position connecting the compressed-video and said second sweep generator and said second-mentioned antenna-rate signal to said display, said switch means having a second position connecting said radar video and said first sweep generator and said first-mentioned antenna-rate signal to said display.

References Cited in the file of this patent

UNITED STATES PATENTS 2,412,670 Epstein ---------------- Dec. 17, 1946